(12) United States Patent
France et al.

(10) Patent No.: US 12,056,295 B1
(45) Date of Patent: Aug. 6, 2024

(54) HID CONTROLLER WITH A RETRACTABLE STYLUS TIP

(71) Applicant: Samsung Electronics Co., Ltd., Suwon-si (KR)

(72) Inventors: Ivan France, Saratoga, CA (US); Nigel Clarke, Sunnyvale, CA (US); Stefan van der Hoff, Mountain View, CA (US); Tara Sriram, Sunnyvale, CA (US); Curtis Aumiller, San Jose, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 18/226,685

(22) Filed: Jul. 26, 2023

Related U.S. Application Data

(60) Provisional application No. 63/440,278, filed on Jan. 20, 2023.

(51) Int. Cl.
*G06F 3/0354* (2013.01)
*G06F 3/038* (2013.01)
*G06F 3/04815* (2022.01)
*G06F 3/04883* (2022.01)

(52) U.S. Cl.
CPC ...... *G06F 3/03545* (2013.01); *G06F 3/03543* (2013.01); *G06F 3/038* (2013.01); *G06F 3/04815* (2013.01); *G06F 3/04883* (2013.01); *G06F 2203/0334* (2013.01); *G06F 2203/0384* (2013.01)

(58) Field of Classification Search
CPC .. G06F 3/03543; G06F 3/03545; G06F 3/038; G06F 3/04815; G06F 3/04883; G06F 2203/0334; G06F 2203/0384
See application file for complete search history.

(56) References Cited

U.S. PATENT DOCUMENTS

| | | | | |
|---|---|---|---|---|
| 5,706,028 A | * | 1/1998 | Murakami | .......... G06F 3/03545 345/157 |
| 6,043,807 A | * | 3/2000 | Carroll | ................. G06F 3/03543 345/157 |
| 10,719,143 B2 | | 7/2020 | Connellan | |
| 11,231,791 B1 | | 1/2022 | Jentz | |
| 2012/0206360 A1 | | 8/2012 | Tuan | |
| 2016/0352383 A1 | * | 12/2016 | Richmond | .............. H04M 1/18 |
| 2017/0108956 A1 | | 4/2017 | Tang | |

(Continued)

FOREIGN PATENT DOCUMENTS

CN 107943326 A 4/2018

OTHER PUBLICATIONS

Meta Quest Pro Touch Controllers (https://www.meta.com/quest/accessories/quest-touch-pro-controllers-and-charging-dock/#techSpecs), Accessed on May 17, 2023.

(Continued)

*Primary Examiner* — Ryan A Lubit (57) ABSTRACT

In one embodiment, an apparatus includes a human-interface-device (HID) controller that includes at least one of an extended reality (XR) controller or a mouse controller. The apparatus further includes an undetachable, fully retractable stylus pointed tip configured to extend from the HID controller, configured so that the stylus tip does not protrude beyond an exterior of the HID controller when in a fully retracted position.

20 Claims, 12 Drawing Sheets

(56) References Cited

U.S. PATENT DOCUMENTS

| | | | |
|---|---|---|---|
| 2021/0035494 A1* | 2/2021 | Yildiz | G06F 1/203 |
| 2021/0191514 A1* | 6/2021 | Zahirovic | G06T 19/006 |
| 2021/0373676 A1* | 12/2021 | Jorasch | G06F 3/038 |
| 2022/0147165 A1* | 5/2022 | Santos | G06F 3/03545 |
| 2022/0261097 A1* | 8/2022 | Lipman | G06F 3/0482 |
| 2022/0276729 A1* | 9/2022 | Gutierrez | G06F 3/016 |
| 2023/0065008 A1* | 3/2023 | Jo | G06F 3/0441 |

OTHER PUBLICATIONS

Logitech Ink Pilot VR Stylus (https://www.logitech.com/en-us/promo/vr-ink.html), Accessed on May 17, 2023.

* cited by examiner

HID CONTROLLER WITH A RETRACTABLE STYLUS TIP

PRIORITY CLAIM

This application claims the benefit under 35 U.S.C. § 119 of U.S. Provisional Patent Application 63/440,278 filed Jan. 20, 2023, which is incorporated by reference herein.

TECHNICAL FIELD

This application generally relates to a human interface device (HID) controller with a retractable stylus tip.

BACKGROUND

A human interface device (HID) is a computing device that can receive human input and provide output to a human. For example, input can be commands for the computing device to perform some functionality. Output can include graphical output, audio output, tactile output, etc.

Controllers are often used as an HID to interact with a computing device. For example, a computer keyboard is often used as an HID to provide alphanumeric input to a computing device, and a mouse is often used as an HID to interact with graphical content displayed on a display. Controllers may also be used as HID devices to interact with an extended reality (XR) system. An XR system can include displaying computer-generated content combined with a real-world scene, for example as in augmented reality (AR) or mixed reality (MR), or can include display of only computer-generated content, such as in virtual reality (VR). The display is often three dimensional. An XR system can include, for example, a head-mounted display (HMD), such as a headset, a pair of glasses, etc., that includes one or more displays for displaying XR content. XR content can include virtual objects or content from one or more applications, such as a web browser, a productivity application, a gaming application, etc., and this content can be displayed along with portions of a user's physical environment, i.e., the real-world environment in the vicinity of the user.

DESCRIPTION OF EXAMPLE EMBODIMENTS

Figure 1:
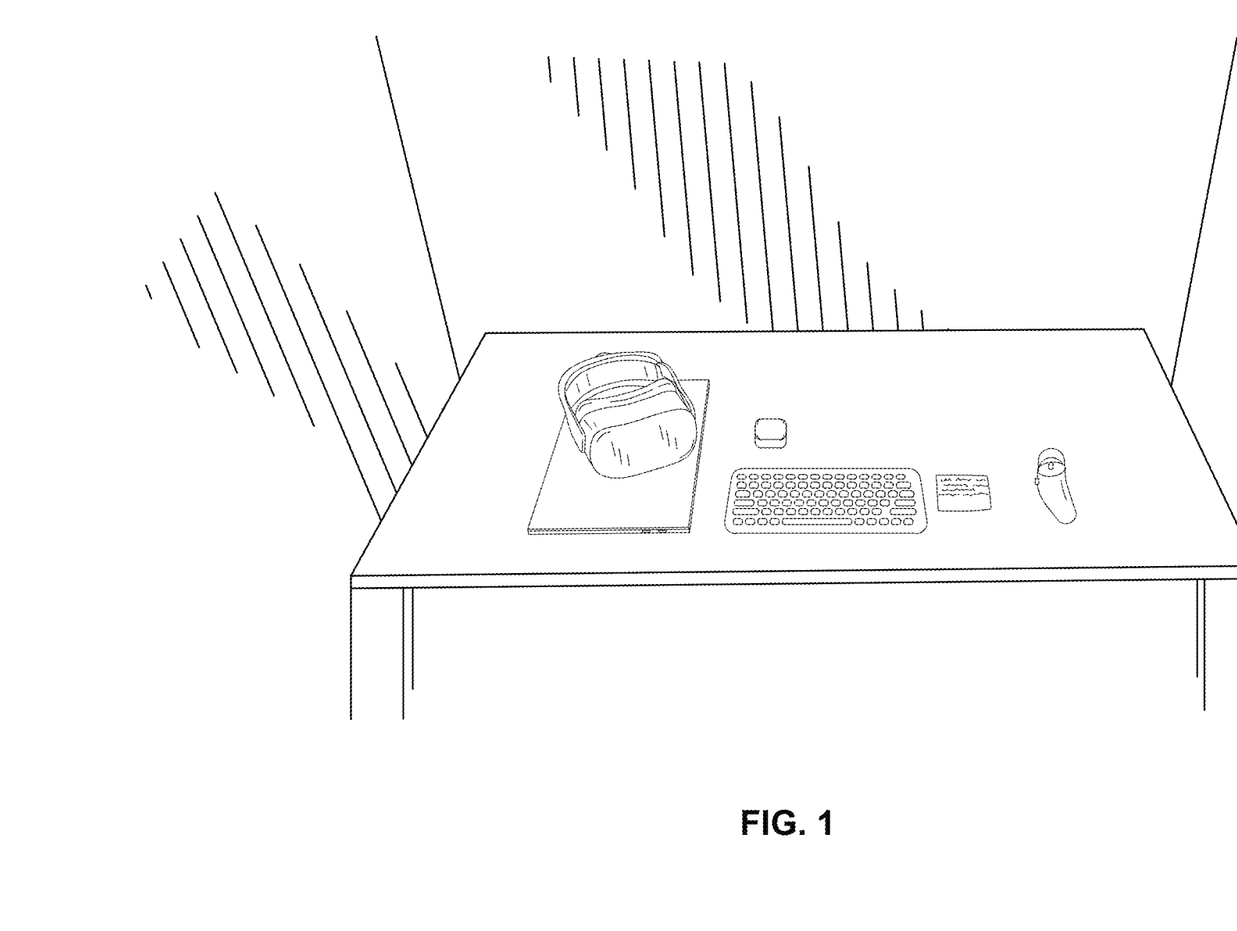
FIG. 1 illustrates an example physical environment.
Figure 2:
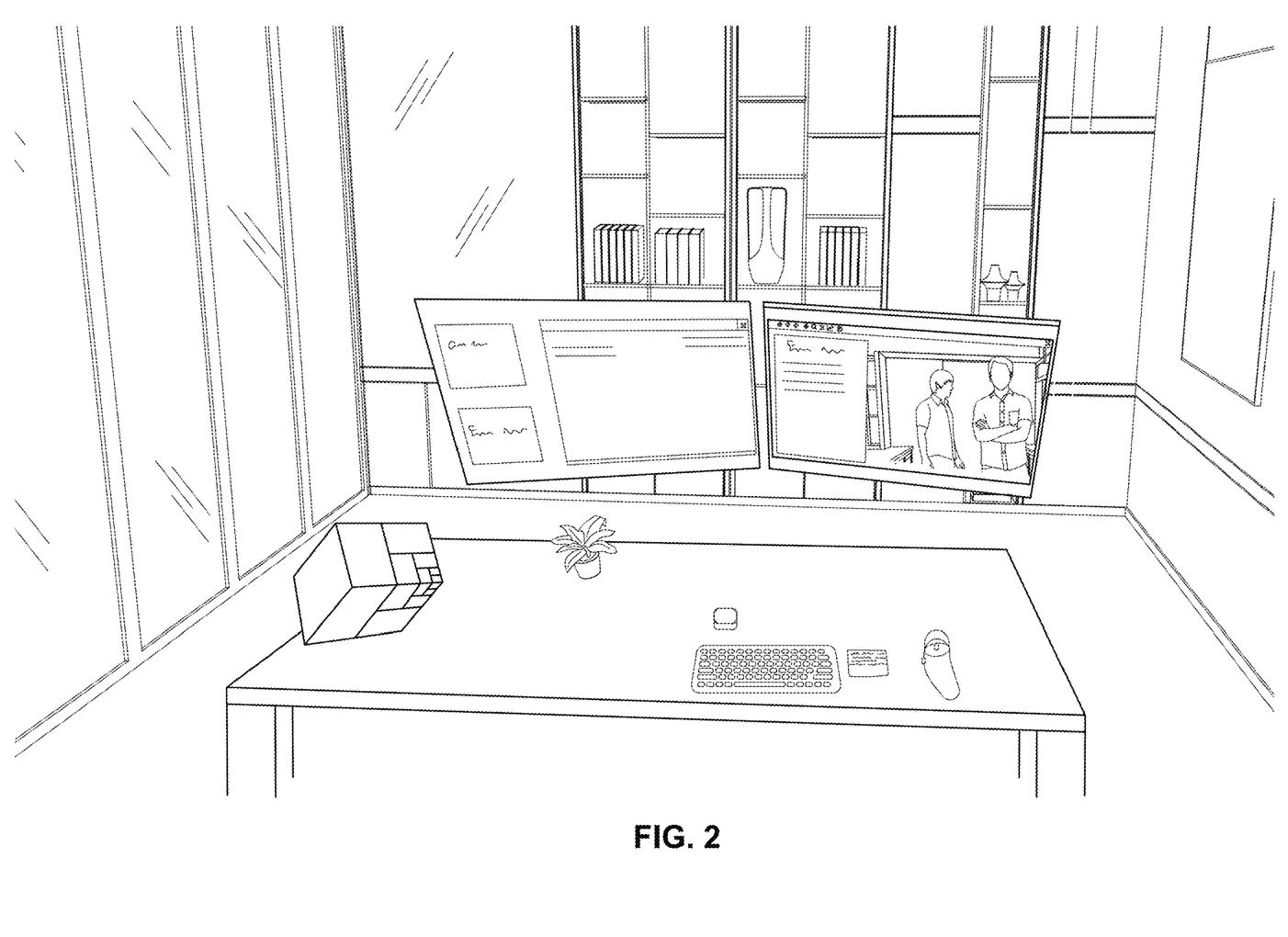
FIG. 2 illustrates an example XR environment.

FIG. 1 illustrates an example physical environment of the user that includes a table surface, a laptop, a keyboard, an XR headset, and an HID controller 100, among other objects. FIG. 2 illustrates an example XR environment that may be displayed to user that is within the physical environment of FIG. 1 when the user activates the XR headset. As illustrated in FIG. 2, the XR environment can include one or more virtual objects (e.g., virtual monitors, virtual workspaces, virtual notes, etc.). FIG. 2 also illustrates a virtual representation 200 of HID controller 100. In particular embodiments, an XR environment may include virtual objects intermixed with real objects, e.g., with real objects in the user's physical environment. Here, XR environments include any environment including virtual representations such as VR, AR, MR, etc. In particular embodiments, a virtual object may spatially track a physical object in the user's environment. For example, virtual representation 200 of HID controller 100 may track the physical location of HID controller 100 in the user's physical environment.

Figure 3:
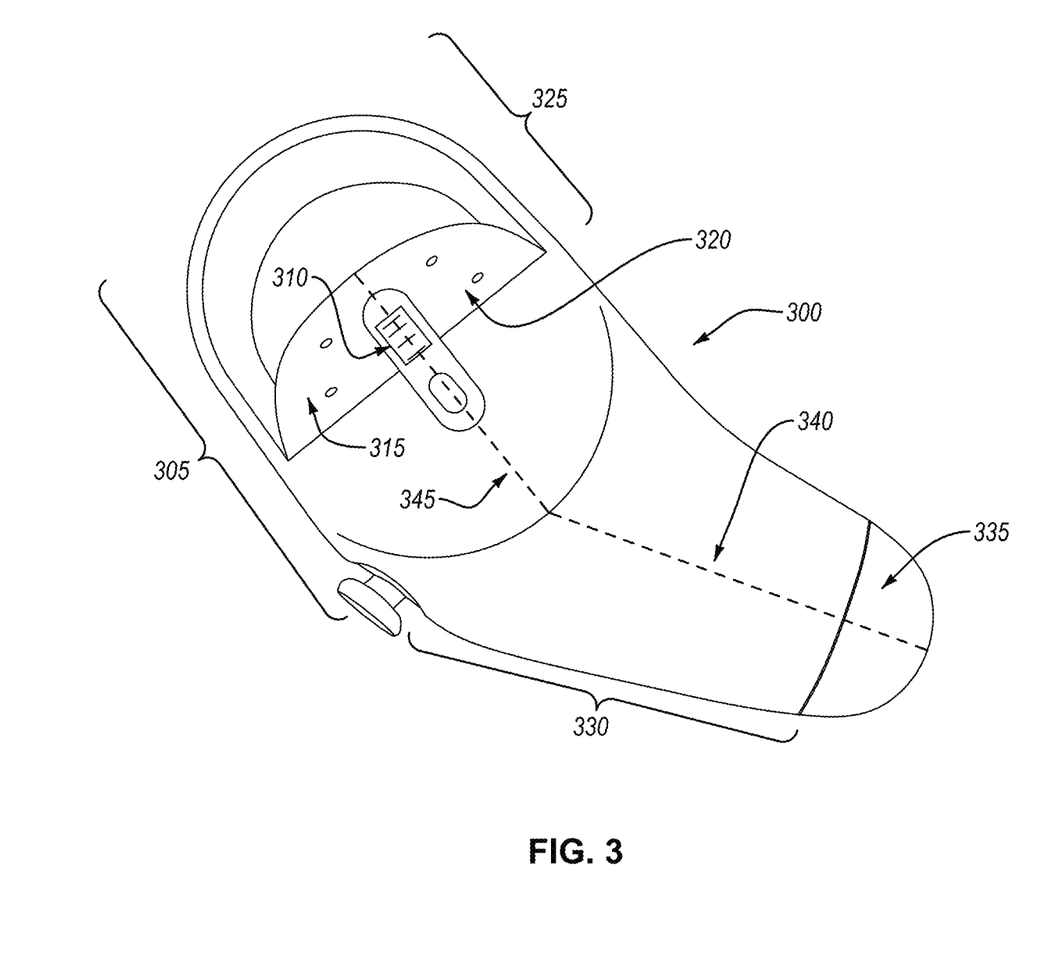
FIG. 3 illustrates a view of an example HID controller.

FIG. 3 illustrates a view of example HID controller 300, which is the same as HID controller 100 illustrated in FIG. 1, except for coloring. Particular embodiments of the HID controller described herein includes an XR controller, a mouse, or both. For example, HID controller 300 includes a portion 305 that includes mouse portions and XR controller portions. For example, the mouse portion of HID 300 includes a scroll wheel 310 and left buttons and right buttons 315 and 320, respectively. An HID controller may also include an optical sensor. HID controller 300 also includes a portion 325 that operates as a controller in XR space, for example using infrared tracking techniques. In particular embodiments, some or all of the mouse portion of HID 300 (e.g., scroll wheel 310, an optical sensor for pointing controls, etc.) can also be used to control an XR environment, for example by using the mouse to control a cursor on a virtual screen, using the mouse to move a ray interactor, etc. HID controller 300 enables a user to transition from traditional computing activities (e.g., by using the mouse portion to control the laptop shown in FIG. 1) and XR computing activities by using the same controller in either instance.

As illustrated in FIG. 3, HID controller 300 includes a stylus-grip portion 330 that extends to an end 335. HID 300 includes an undetachable, fully retractable stylus tip that, in the example of FIG. 3, extends from an opening in end 335. In the example of FIG. 3, stylus grip-portion 330 is substantially conical and tapers toward end 335 so that it is smaller at end 335 than at its opposite end. In the example of FIG. 3, a centerline 340 of stylus grip portion 330 along its length is offset from a centerline 345 of the rest of the body of HID controller 300. While the example of FIG. 3 illustrates specific configurations for a mouse controller, an XR controller, and a stylus in an HID controller, this disclosure contemplates that an HID controller described herein may have any suitable configuration(s) of those components, when present in an HID controller. For example, a stylus-grip portion may overlap, or be part of, a mouse portion of an HID controller, in particular embodiments.

Figure 4:
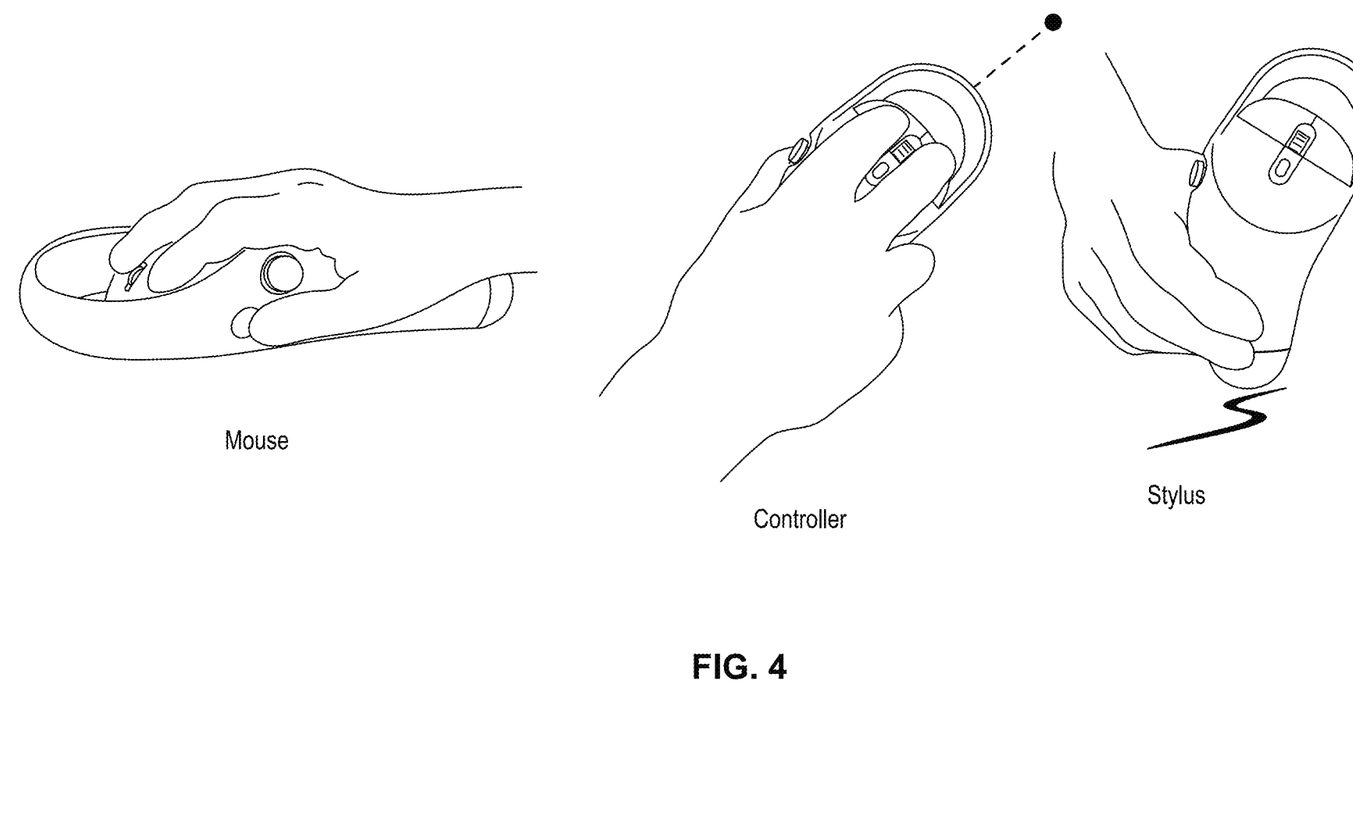
FIG. 4 illustrates example user interactions with an example HID controller.

FIG. 4 illustrates example user interactions with HID controller 300 during various activities, including using HID 300 as a mouse, using HID controller 300 as an XR controller, and using HID controller 300 as a stylus to write on a physical surface or a virtual surface.

In particular embodiments, a stylus portion of an HID controller may be used during traditional computing activities and during XR computing activities. For example, the stylus tip of HID device 300 may be used to write on a physical computing display, such as a touch-sensitive display of a laptop or tablet. The stylus tip may also be used to interact with virtual surfaces, such as 2D or 3D surfaces in virtual space.

Users are very sensitive to lift-off distance when writing, i.e., the distance required to lift a writing implement from a surface so that the implement can be moved without writing on a surface. Writing on a purely virtual surface, such as a 2D whiteboard, can be frustrating because the surface may not provide haptic feedback notifying the user when the writing implement is "contacting" the virtual surface vs. when the writing implement is not contacting that surface, requiring trial and error or exaggeratedly large movements from the user to determine writing positions for the writing implement. In particular embodiments, mapping a virtual surface to real, physical surface can alleviate these challenges because the real surface provides feedback regarding lift-off distance that the user can use to understand the surface-to-pen spatial relationships. In particular embodiments, a non-stylus portion or a stylus portion of an HID controller, such as HID controller 300, may be used to write on purely virtual surfaces (e.g., virtual surfaces that don't correspond to any real object(s)). For example, end 335 of HID controller 300 may be used to write on a purely virtual surface, even when the stylus tip is fully retracted. In contrast, a stylus tip may be used to interact with virtual surfaces that are mapped to real surfaces, and may be used to write on real surfaces (e.g., on a tablet screen, etc.).

Figure 5:
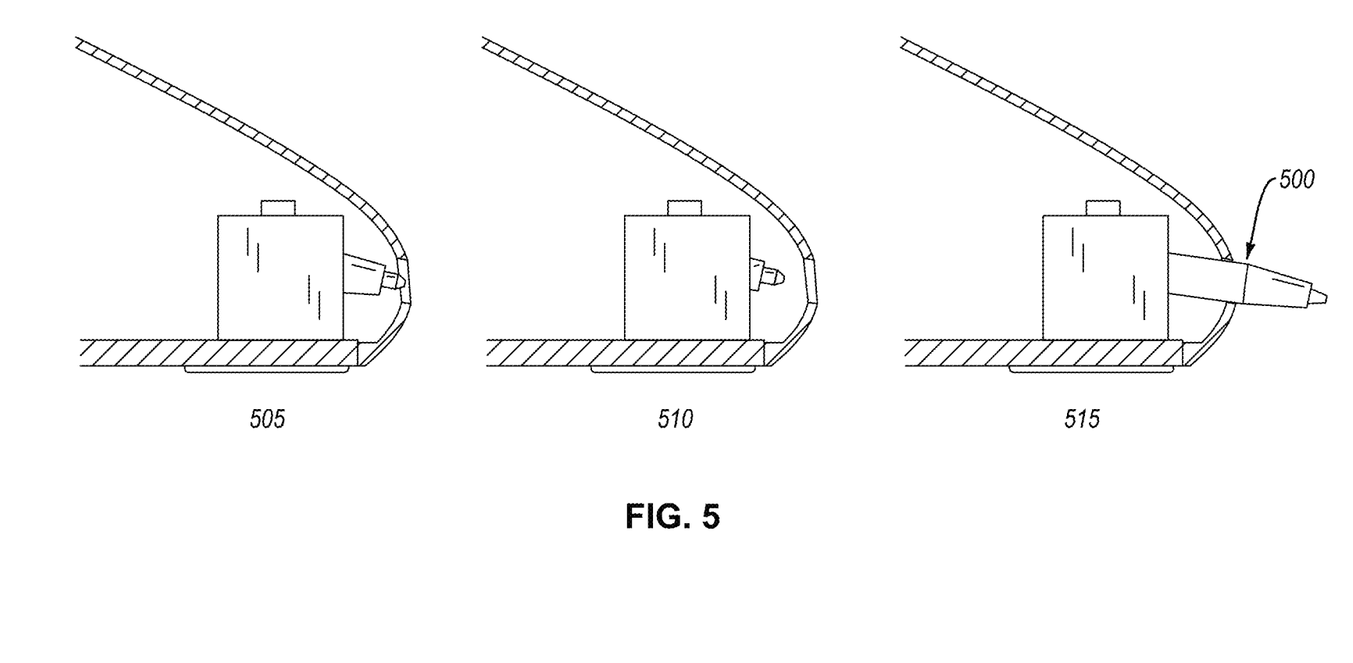
FIG. 5 illustrates an example retractable stylus tip.

FIG. 5 illustrates an example retractable stylus tip 500 of HID controller 300. In the example of FIG. 5, stylus tip 500 terminates at a pointed end, which allows for consistent writing reference by the user. As illustrated in the example of FIG. 5, stylus tip 500 may transition between a fully retracted configuration illustrated in image 505 and a fully extended configuration illustrated in image 515. In the example of FIG. 5, stylus tip 500 may, in the fully retracted configuration, sit entirely within the body of the HID controller. In particular embodiments, in the fully retracted configuration, stylus tip 500 may sit flush with an exterior surface of a portion of HID controller. In particular embodiments, as described more fully herein and as illustrated in image 510, a stylus tip may translate in one dimension to move between a fully retracted position and a fully extended position, and may travel a particular pretravel distance in that dimension in order to move between the fully retracted and the fully extended positions.

To actuate a stylus tip between bi-stable fully extended and fully retracted positions, particular embodiments may utilize a spring-loaded arm or pin that follows a heart-shaped track when pushed such that the pin is caught in one of two positions. Other embodiments may utilize an axial-style plunger (similar to that on a click pen) that, when depressed, slides along an interior of a grooved housing. The plunger advances a free-floating cam that slides along the grooves and that is free to rotate when pushed past the length of the grooves. Sloped surfaces on the extension plunger and end of the grooved housing catch the sliding cam at one of two levels. Each of the two actuation examples discussed in this paragraph require some amount of pretravel (an example of which is illustrated in image 510 of the example of FIG. 5) to actuate a stylus tip between bi-stable states.

Figure 6:
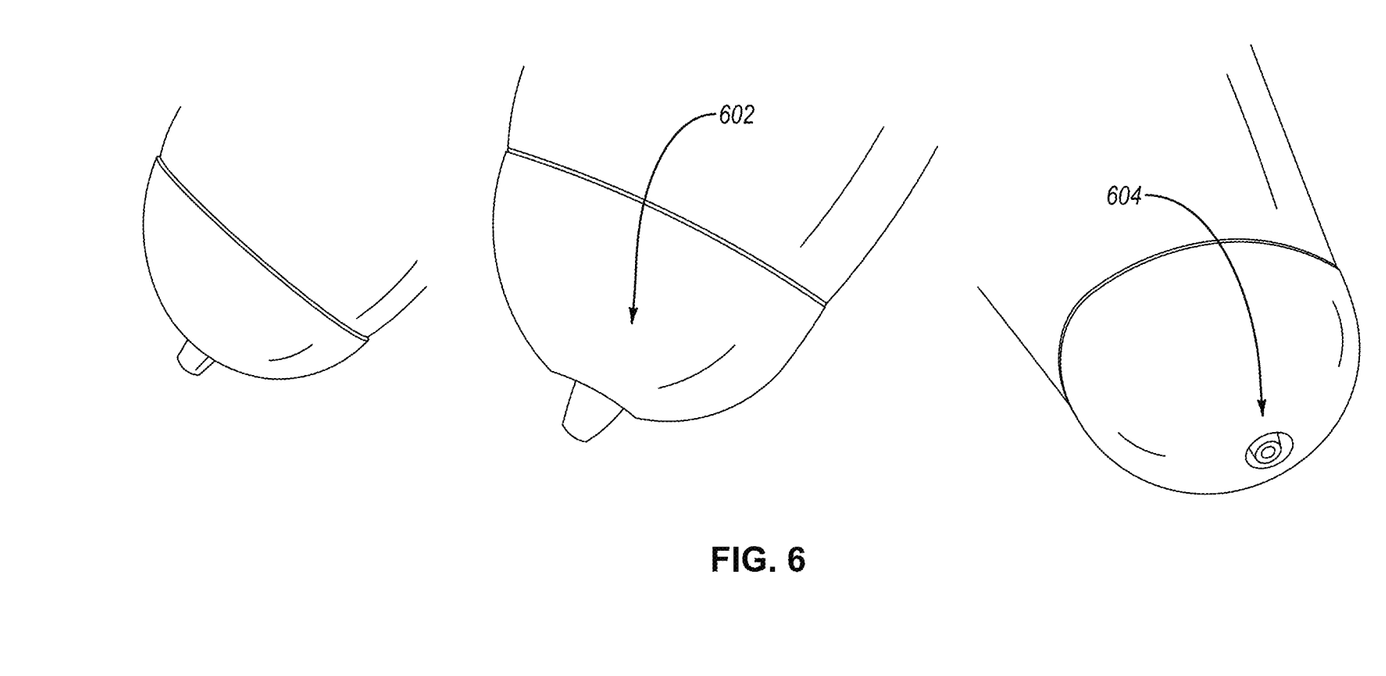
FIG. 6 illustrates an example end of an example HID controller.
Figure 7:
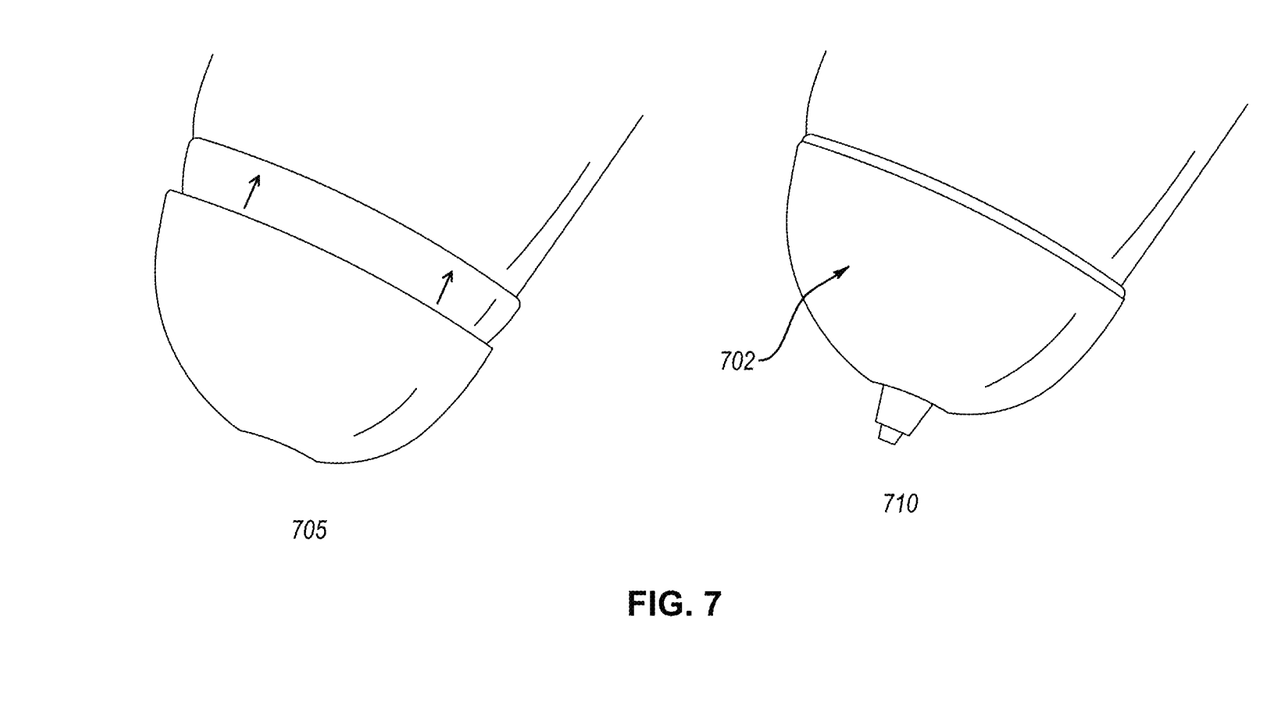
FIG. 7 illustrates another example end of an example HID controller.

Particular embodiments of an HID controller described herein actuate a stylus tip using mechanisms that a user can easily and conveniently actuate with one hand (i.e., with the hand holding the controller). FIG. 6 illustrates example views of end 335 of HID controller 300. End 335 may be made of a deformable (e.g., rubber) material 602, which a user can, while holding the stylus (e.g., holding stylus-grip portion 330), depress downward into a physical surface to actuate the stylus tip. The deformation of end 335 permits the pretravel necessary to actuate the stylus tip between extended and retracted states, in particular embodiments. FIG. 7 illustrates another example in which end 335 is made of a rigid material 702, and end 335 itself can translate in response to sufficient force. For example, image 705 illustrates that, when the stylus is in the fully retracted position, downward pressure caused by a user pressing end 335 into a surface can translate end 335 in the direction of the arrows shown. Image 710 illustrates an example in which end 335 has translated to the fully extended position, revealing the stylus tip. A user may put downward force on end 335 in order to actuate the stylus back to the fully retracted position. In each of the examples of FIG. 6 and FIG. 7, a user can actuate the stylus tip using only one hand. In particular embodiments, a user may be interacting with a computing system using two controllers (i.e., one in each hand), illustrating an example benefit of one-handed stylus actuation.

Figure 8:
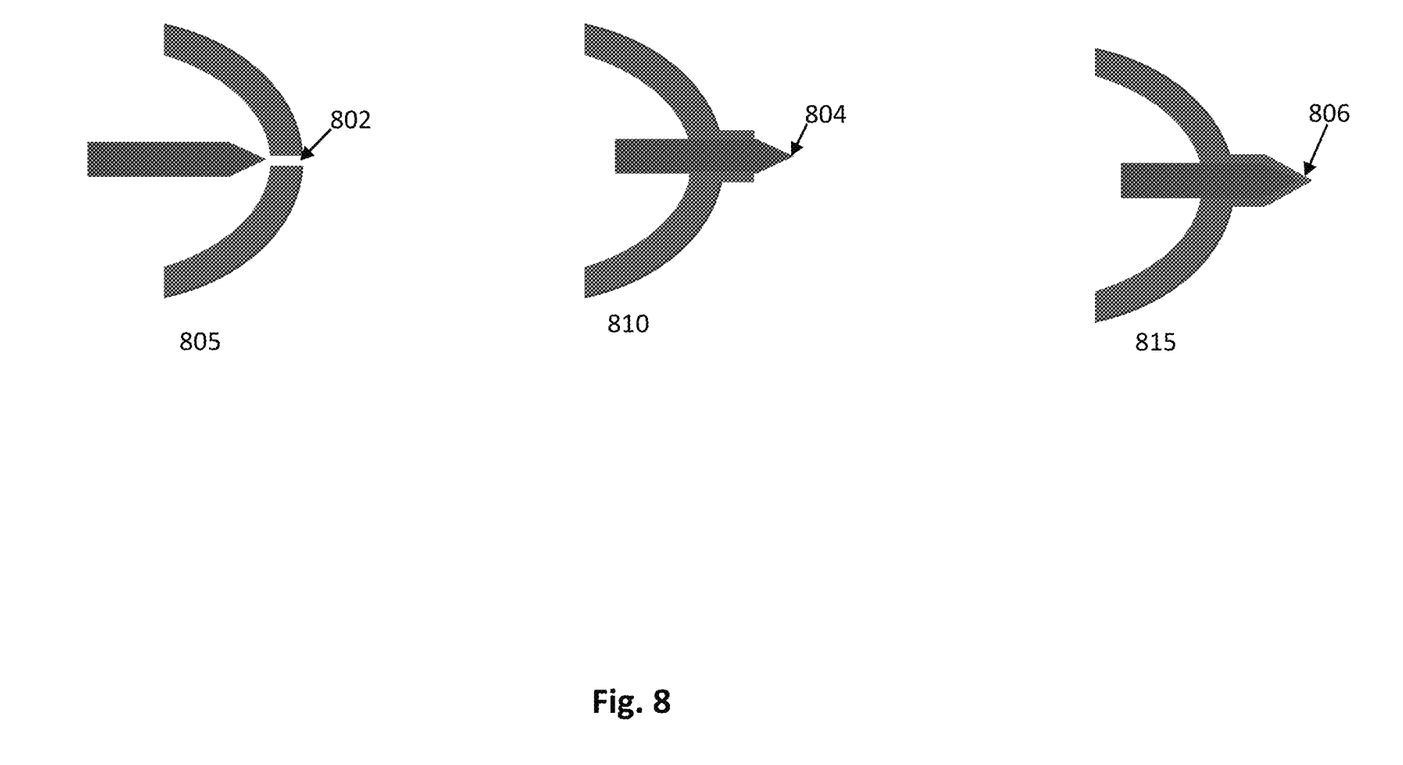
FIG. 8 illustrates an example of a stylus tip configuration.
Figure 9:
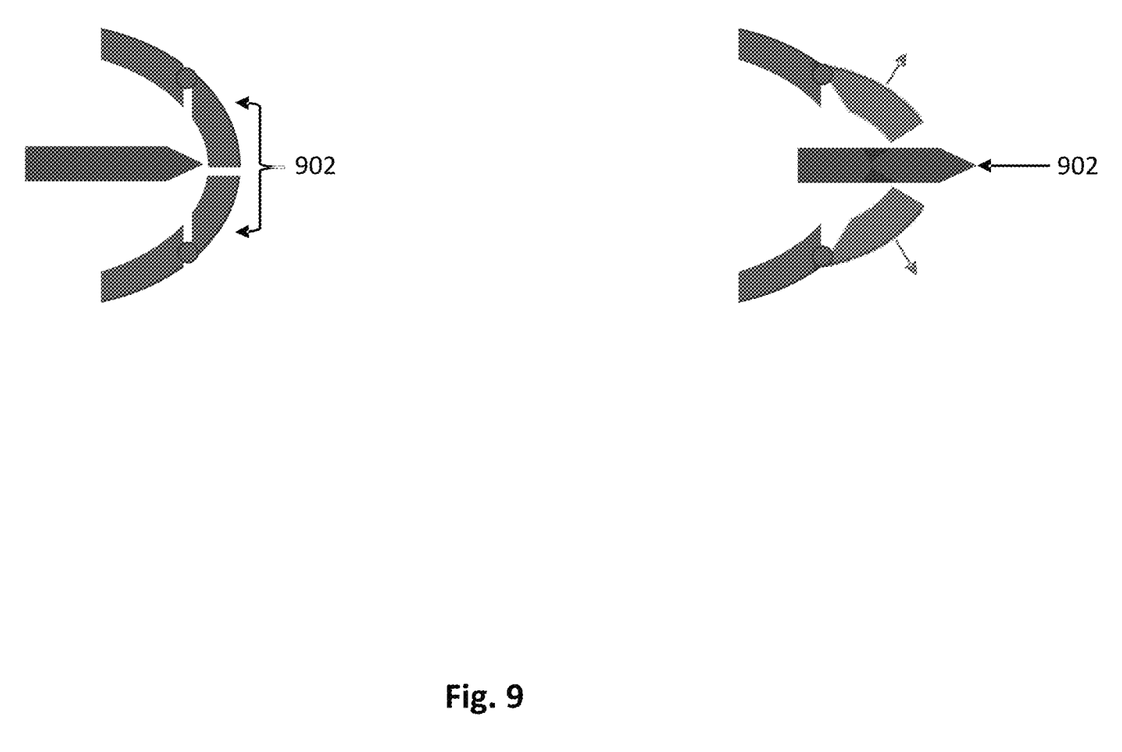
FIG. 9 illustrates another example of a stylus tip configuration.

In particular embodiments, a stylus tip may extend through an opening, such as a hole, in the surface of the stylus end. For example, FIG. 6 illustrates an example of opening 604 in an end 602 of the stylus. In particular embodiments, as illustrated in example images 805 and 810 of FIG. 8, a stylus tip 804 may be larger than an opening 802 through which the stylus tip moves, and the material around the opening may be flexible and stretch open as the stylus moves from a restricted to an extended position. In particular embodiments, as illustrated in example image 815 of FIG. 8, a portion of a stylus end may include a flexible material 806 covering the stylus tip, and this flexible material may stretch to cover the stylus tip as the stylus moves from a retracted position to an extended position, creating a stylus-shaped protrusion in the flexible material. In particular embodiments, a mechanical mechanism may be used to cover/uncover a stylus opening when the stylus tip actuates between retracted and extended states. For instance, FIG. 9 illustrates an example in which mechanism 902 articulates open and shut as the stylus tip 904 extends and retracts, respectively.

Figure 10:
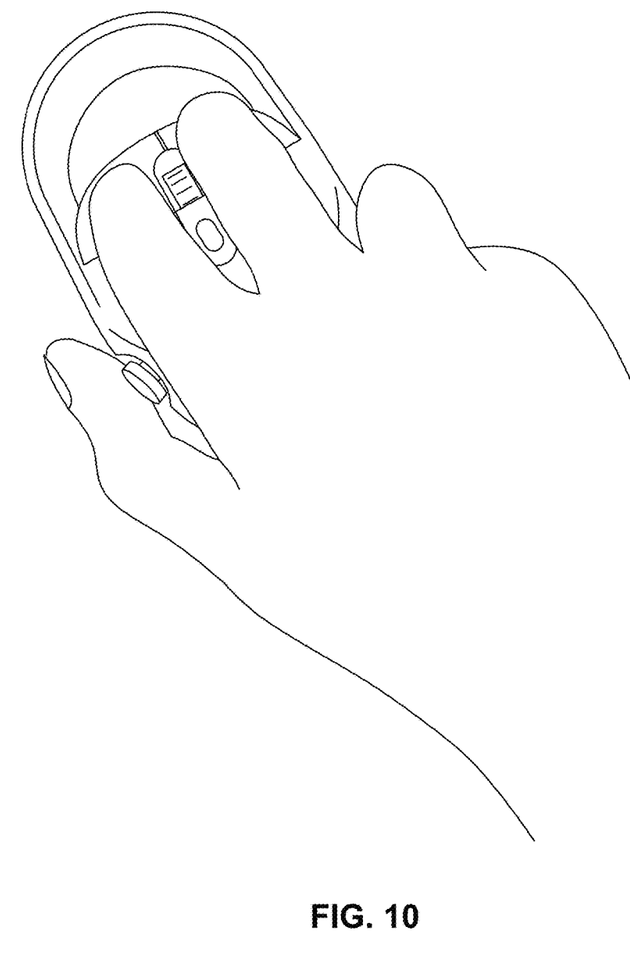
FIG. 10 illustrates an example use of an example HID controller.

Because the stylus tip of the HID controller described herein is fully retractable, the stylus tip can be retracted when the controller is used as a mouse controller and/or as an XR controller, i.e., when a stylus is not needed. For example, FIG. 10 illustrates, in the context of the example HID controller 300, that a protruding stylus tip would interfere with the user's hand when the user uses the controller as a mouse. However, because the stylus tip is fully retractable, the stylus functionality of the HID controller does not interfere with the user's interactions with the controller in these use cases. Moreover, because the stylus is permanently affixed to the controller, a user can store the stylus tip without having to physically remove the tip and store the tip in a known location or find the tip at the stylus's next use. In addition, as discussed more fully herein, particular embodiments provide convenient one-handed operation to transition the stylus tip between extended and retracted states.

As explained above, embodiments of the stylus disclosed herein have a pointed tip, which provides a consistent reference point of contact between the stylus and a surface. When in an extended state, the stylus of an HID controller described herein has dimensions so that the stylus tip has sufficient clearance from other controller components so that only the stylus tip contacts the writing surface under a variety of writing grips and writing conditions. For example, FIG. 11 illustrates a stylus tip in an extended position.

Figure 11:
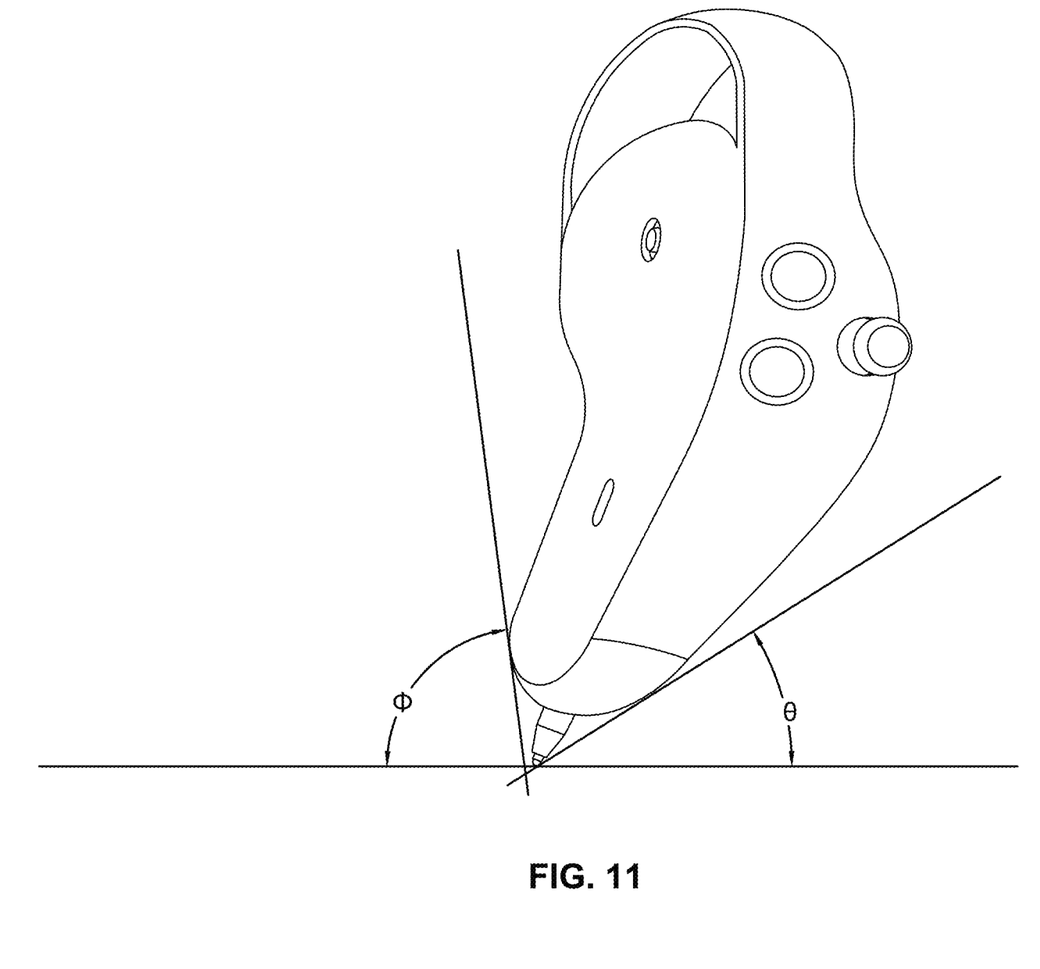
FIG. 11 illustrates an example stylus tip in an extended position.

Relative to a writing surface 1102, the form of the HID controller and the stylus tip in the example of FIG. 11 permits writing at any angles $\phi>0$ and $\theta>0$, and these threshold conditions correspond to holding the controller almost parallel to the writing surface 1102. As illustrated in the example of FIG. 11, this configuration depends on the relationship between the length of the extended stylus tip and the size of the controller in dimensions perpendicular to the length of the stylus tip.

Particular embodiments of an HID controller may include a pressure-sensitive tip, for example to vary some functionality associated with a computing activity in response to varying tip pressure. For example, a thickness of a line made on a real display or on a virtual surface may vary based on the pressure used by the stylus (e.g., more pressure may result in a thicker line). Particular embodiments of an HID controller may include a contact sensor, such as a pressure-sensitive tip, that can be used to calibrate positional sensing during XR usage. For example, if the contact sensor detects that a stylus is making contact with a physical surface, but in virtual space the virtual stylus is not contacting a corresponding virtual surface, then the positional calibration of the HID controller can be updated, for example by adjusting the position of the virtual surface to the point of the HID controller and/or by adjusting the position of the virtual controller lower such that it is in contact with the virtual surface.

In particular embodiments, an HID controller may be represented in XR space as a virtual object having a form factor other than the controller's form in physical space. For example, when used as a stylus in XR space, an HID controller may be represented as a pencil, a pen, a marker, a crayon, etc. In particular embodiments, the controller's virtual form may correspond to the writing functionality associated with the controller when used as a stylus. For example, the controller may appear as a pencil of a particular color when a user selects that color to draw with, and the pencil may changes colors as the user selects different colors to draw with.

In particular embodiments, when a user actuates a stylus tip to a fully extended state, the controller may detect the state change (e.g., using a mechanical switch, an encoder, a hall-effect sensor, or any other suitable sensor) and communicate the state change to an associated computing system (e.g., a tablet, a laptop, an XR system, etc.). In particular embodiments, the communication may be over a wireless or wired connection. The computing system may then update visual representations, for example in XR space by visually show the stylus protruding; re-style the controller as a writing implement, change a transparency of an indicator so it's easier to see the stylus's contact point (i.e., tip), or notify a user of a physical desk location. In particular embodiments, the computing system may also update functionality associated with the controller, for example by remapping the functions of physical buttons or other interactive elements on the controller, and/or by disabling ray-casting hover events from the controller, etc.

Figure 12:
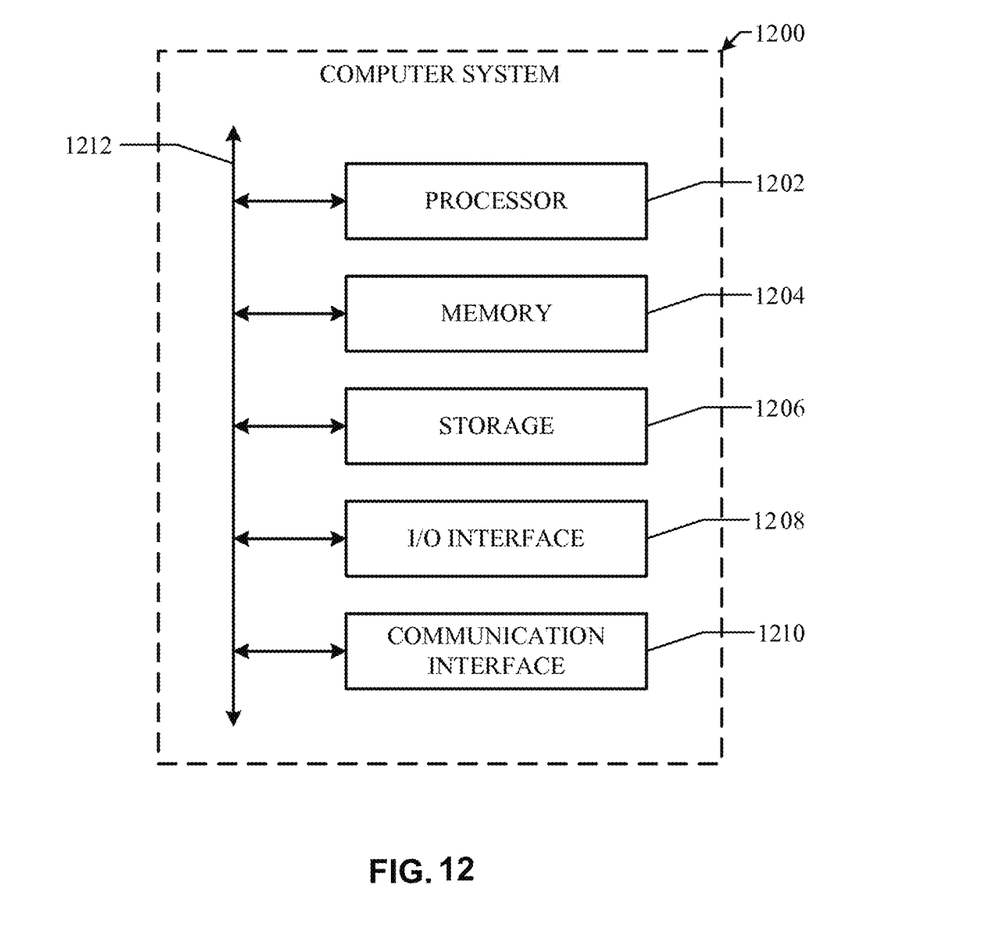
FIG. 12 illustrates an example computing system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. An apparatus comprising:
   a human-interface-device (HID) controller comprising:
   (1) at least one of an extended reality (XR) controller or a mouse controller and (2) a stylus-grip portion, wherein at least part of the stylus-grip portion is distinct from, and coupled to, at least one of the XR controller or the mouse controller; and
   an undetachable, fully retractable stylus pointed tip configured to extend from, and retract into, the stylus-grip portion of the HID controller, wherein the stylus tip does not protrude beyond an exterior of the HID controller when in a fully retracted position.

2. The apparatus of claim 1, wherein the stylus-grip portion is substantially cylindrical and comprises:
   a first end coupled to at least one of the XR controller or the mouse controller; and
   a second end opposite the first end, wherein the stylus tip is extendable from, and retractable into, the second end.

3. The apparatus of claim 2, wherein the stylus-grip portion is tapered from the first end to the second end such that the second end is narrower than the first end.

4. The apparatus of claim 2, wherein the second end comprises a convex shape.

5. The apparatus of claim 1, wherein the HID controller comprises the mouse controller and the XR controller.

6. The apparatus of claim 1, further comprising:
   a bi-stable release mechanism configured to actuate the undetachable, fully retractable stylus pointed tip; and
   a non-concave surface covering the bi-stable release mechanism.

7. The apparatus of claim 6, wherein the non-concave surface comprises a convex surface.

8. The apparatus of claim 6, wherein the non-concave surface is configured to deform or to translate into a portion of the HID controller in order to actuate the bi-stable release mechanism.

9. The apparatus of claim 1, wherein a portion of a surface of the HID controller comprises an opening through which the stylus tip extends.

10. The apparatus of claim 9, wherein the opening is larger than an area of the stylus tip in an imaginary plane parallel to the opening.

11. The apparatus of claim 9, wherein:
    the opening is smaller than the area of the stylus tip in the in the imaginary plane parallel to the opening; and
    the portion of the surface of the HID controller comprises a flexible material.

12. The apparatus of claim 1, wherein a portion of a surface of the HID controller comprises a flexible covering configured to create a stylus-tip-shaped protrusion when the stylus tip is extended.

13. The apparatus of claim 1, further comprising a detector configured to detect a transition of the stylus tip from the fully retracted position to an extended position.

14. The apparatus of claim 13, further comprising a wireless communication module configured to wirelessly communicate a detected transition to a computing device.

15. The apparatus of claim 1, wherein the stylus-grip portion extends to and includes an end of the HID controller, and wherein the fully retractable stylus pointed tip is configured to extend from, and retract into, the end of the HID controller.

16. A method comprising:
    processing one or more tasks for utilizing a human-interface-device (HID) controller as a mouse controller associated with a computing device or as an extended reality (XR) controller associated with an XR environment, wherein the HID controller is operable with one hand, and wherein the HID controller comprises a stylus-grip portion, wherein at least part of the stylus-grip portion is distinct from, and coupled to, at least one of the XR controller or the mouse controller;
    activating, in response to an action performable using the one hand, a release mechanism to extend a stylus tip from a retracted position within the stylus-grip portion of the HID controller to an extended position protruding from the stylus-grip portion of the HID controller; and
    operating, in response to detecting one or more commands initiated by the one hand, the HID controller as an electronic writing instrument to interact with a physical electronic display or a virtual display.

17. The method of claim 16, wherein activating the release mechanism to extend the stylus tip from the retracted position within the stylus-grip portion of the HID controller to the extended position protruding from the stylus-grip portion of the HID controller comprises pressing a portion of the HID controller comprising the release mechanism against a physical surface.

18. The method of claim 17, wherein the portion of the HID controller comprising the release mechanism comprises a deformable surface covering the release mechanism.

19. The method of claim 17, wherein the portion of the HID controller comprising the release mechanism comprises a translatable, rigid surface covering the release mechanism.

20. The method of claim 16, wherein the stylus-grip portion is substantially cylindrical and comprises:
 a first end coupled to at least one of the XR controller or the mouse controller; and
 a second end opposite the first end, wherein the stylus tip is extendable from, and retractable into, the second end.

* * * * *